United States Patent Office 3,164,895
Patented Jan. 12, 1965

3,164,895
METHOD OF FABRICATING HOLLOW BODIES AT ELEVATED TEMPERATURES
Ben Davies, Pittsburgh, and Roger W. Woodruff, Library, Pa., assignors to Harbison-Walker Refractories Company, Pittsburgh, Pa., a corporation of Pennsylvania
No Drawing. Filed Aug. 28, 1962, Ser. No. 220,064
3 Claims. (Cl. 29—423)

This invention relates to an improved welding process and more particularly to an improved process for elevated temperature joining of hollow members.

It has heretofore been possible to join hollow members such as metal tube segments, by various welding techniques, to provide elongate tubes having continuous and unbroken walls. In one technique a small ceramic rod was inserted into the opposed, abutting open ends of a pair of tube segments to hold them together, and to maintain uniform internal diameter and prevent distortion of the tube ends when subjected to the high temperatures of welding. After joining the tubes, the ceramic rods or inserts were broken or shattered and knocked out by jabbing with a metal rod or the like.

While the foregoing has been satisfactory for joining straight tube segments of somewhat shorter lengths, longer segments, and curved tube segments, are not particularly amenable to this technique.

Accordingly, it is an object of this invention to provide an improved method of joining hollow members. It is another object of this invention to provide an improved method of joining sections of weldable metal tubing.

According to one embodiment of this invention, there is provided readily hydratable refractory inserts, outside dimensions of which closely approximate internal dimensions of the open ends of weldable hollow members which are to be joined. For example, when joining curved sections of stainless steel tubing, a short, solid, mandrel or rod-like member is fabricated of a readily hydratable refractory material. The open ends of segments of the curved tubing to be joined are abutted by passing over opposed ends of the refractory rod, in preparation for subsequent welding. The actual welding is then undertaken to join the ends of the tubes which abut about the refractory rod. Since the rod is preferably smooth surfaced and is of a refractory oxide material, the internal dimensions of the tubes adjacent the open ends which are welded do not vary; and the weld which results, if exposed internally of the joined tubes, will likewise be smooth surfaced and will have an internal diameter substantially equivalent to the diameter of the joined tubes. After joining the curved sections of tubing, hot water or steam under pressure is directed internally of the joined tubes to rapidly slake or disintegrate the refractory rod.

A burned insert of magnesite or dolomite is preferred, but both burned and unburned refractory rods or inserts may be used, according to the concepts of this invention, so long as they are readily hydratable with hot water, i.e., water above 150° F., or which are readily hydratable with low pressure steam.

In a series of comparative tests a plurality of small hollow rods, approximately .5" long having an outside diameter of 0.432" and an inside diameter of about 0.14" were tested to determine their relative hydratability. The following table sets forth the results of the tests:

*Table I*

| Mix | Composition | Burned Temp., °F. | Burning Shrinkage, percent | Cold Crushing Strength, p.s.i. | Hydration Property |
|---|---|---|---|---|---|
| 1 | 72% Austrian MgO<br>28% Dolomite | 2,300 | 0.03 | 4,300 | Hydrated in open air. |
| 2 | 72% Austrian MgO<br>28% Dolomite | 2,500 | 6.5 | 43,000 | Sound after 15 minutes in 80 p.s.i. steam. |
| 3 | Dolomite | 2,200 | 0.07 | 2,600 | Slaked after 12 minutes in hot water. |
| 4 | ---do--- | 2,300 | 0.95 | 5,800 | Do. |
| 5 | ---do--- | 2,500 | 2.3 | 15,000 | Do. |
| 6 | ---do--- | 2,600 | 2.0 | 15,000+ | Slaked after 25 minutes in hot water. |
| 7 | High Purity MgO | 2,200 | 0.30 | 7,200 | Hydrated after 5 minutes in 80 p.s.i. steam. |
| 8 | High Purity MgO+ 2½% $Al_2O_3$. | 2,200 | 0.20 | 5,200 | Hydrated after 3 minutes in 80 p.s.i. steam. |
| 9 | High Purity MgO+ 5% $Al_2O_3$. | 2,200 | 0.16 | 4,000 | Do. |

Typical chemical analysis of raw materials used in the above tests are as follows:

*Table II*

| | Austrian MgO | High Purity Magnesite | Dolomite |
|---|---|---|---|
| $SiO_2$ | 0.6 | 3.5 | 1.2 |
| $Al_2O_3$ | 0.6 | 0.4 | 0.8 |
| $Fe_2O_3$ | 6.5 | 0.3 | 5.0 |
| CaO | 3.3 | 0.9 | 53.0 |
| MgO (by difference) | 89.0 | 94.9 | 39.8 |

The foregoing materials were all in the dead burned condition. The $Al_2O_3$ used in Mixes 8 and 9 was approximately 99% $Al_2O_3$, and was all —325 mesh. The mixes in Table I were typically —65 mesh, but a preferred screen sizing for mixes according to the invention is about 10% —28+65, 40% —65+150, and 50% —325 mesh. In the foregoing discussion, all analyses are by weight, and on the basis of an oxide analysis. All mesh sizes are by Tyler screen series. For all of the mixes, 8%, by weight, of water based on total solids content, was used as tempering media. The test cylinders were formed at about 35,000 p.s.i.

It was found that the diameter of the burned inserts, of a given composition, had very little variation in outside diameter, i.e., the burned inserts of a given composition might vary on the order of 0.0008" from one to the next. The hot water used in the tests was approximately 212° F. (boiling). The low pressure steam tests were conducted in a Cenco-Menzel autoclave.

It should be noted that the temperature of the burn had a decided effect upon the rate of hydration with certain of the mixes. Comparing Mixes 1 and 2, for instance, both of which had the same composition, the one (Mix 2) burned at 2500° F. was sound after 15 minutes when subjected to 80 p.s.i. steam pressure; whereas the other (Mix 1) burned at 2300° F. hydrated in open air. Compare also Mixes 4, 5, and 6 which indicate change in hydration properties with variation in burning temperature. Of all the mixes of Table I, the preferred mixes are Mixes 8 and 9, which exhibited good cold crushing strength (providing good handleability at room temperature) but which readily hydrated in but three minutes in the steam autoclave. Also, good strength is necessary to:

(1) Resist necking down or constricting of the tube ends during welding.
(2) Keep tube ends in register should any shear force be applied.

The foregoing table covers testing of refractory cylinders, of substantially uniform diameter, which were made by power pressing. It was found that more intricate shapes could be made by machining pressed and burned blocks of Table I compositions. Such machined shapes are equally within the concepts of this invention. Further, larger shapes may be made by casting techniques.

In still other tests, readily hydratable inserts were fabricated of an unburned mixture of refractory grain which analyzed approximately 90% MgO and about 10% CaO. These inserts were found quite satisfactory. The inserts made with this mix were found to exhibit even better hydration tendencies when soaked in a 5% potassium hydroxide solution. Sodium hydroxide solutions also gave good results. An alkaline hydroxide solution also improved hydration tendencies of burned inserts.

In other tests, a chemically bonded magnesite mix was used (98% MgO). This mix was formed into shapes at 36,000 p.s.i. The cold crushing strength of these unburned shapes was adequate for handling at room temperatures. The samples slaked very rapidly in hot water.

In the practice of the method of this invention, of course, it is necessary that the readily hydratable refractory inserts have dimensional stability up to and above the temperature to which they will be subjected during the welding operation. This temperature has been found to be on the order of 2600 to 2700° F. for stainless steel tubing. It is preferred that the surfaces of the insert, which are to be encompassed within the open ends of the bodies to be joined, be of sufficient dimension as to be frictionally engaged by said bodies when assembled for welding.

In the foregoing discussion, the utility of my invention in joining stainless steel or other metal tubes has been discussed. It should, of course, be understood the invention is equally applicable to elevated temperature joining of various other materials. Furthermore, the concept of a readily hydratable refractory insert for fabricating various hollow shapes is applicable to those processes in which hollow bodies are fabricated by techniques of winding Fiberglas filament about a mandrel and impregnating with plastic. In this instance, the mandrel is fabricated of readily hydratable refractory material, as discussed above. After annealing of the wound and impregnated Fiberglas filament, the refractory mandrel is easily removed, as by flushing with low pressure steam or hot water.

In any of the uses discussed above it is of course desirable that the refractory material selected be substantially inert to the hollow bodies to be joined, both in the dry state and in the wet state.

Having thus described the invention in detail and with sufficient particularity as to enable those skilled in the art to practice it, what we desire to have protected by Letters Patent is set forth in the following claims.

We claim:
1. In method of fabrication of hollow bodies at elevated temperatures, in which the fabrication is executed about a mandrel or the like, the improvement which comprises fabricating the bodies about a readily hydrtable refractory mandrel composed of a material selected from the group consisting of dead burned magnesite and dead burned dolomite, said refractory mandrel being substantially inert to the material which comprises the hollow bodies, said mandrel having dimensional stability up to at least the temperature to which it will be subjected in the actual fabrication of the bodies, subjecting it to moisture at an elevated temperature upon completion of the fabrication of a hollow body, and flushing the material of the destroyed mandrel from the hollow body.

2. In methods of fabrication of hollow bodies at elevated temperatures, in which the fabrication is executed about a mandrel or the like, the improvement which comprises fabricating the bodies about a readily hydratable refractory mandrel, composed of at least 90%, by weight, of dead burned magnesite and only one material selected from the group consisting of CaO and $Al_2O_3$, said latter material when present constituting no more than 5%, by weight of said mandrel, said refractory mandrel being substantially inert to the material which comprises the hollow bodies, said mandrel having a dimensional stability up to at least the temperature to which it will be subjected in the actual fabrication of the bodies, subjecting it to moisture at an elevated temperature upon completion of the fabrication of a hollow body, and flushing the material of the destroyed mandrel from the hollow body.

3. In methods of fabrication of hollow bodies at elevated temperatures, in which the fabrication is executed about a mandrel or the like, the improvement which comprises fabricating the bodies about a readily hydratable refractory mandrel, composed of, by weight, 90% dead burned magnesite and 10% CaO, said mandrel being soaked in a 5% alkaline hydroxide solution selected from the group consisting of potassium hydroxide and sodium hydroxide, said refractory mandrel being substantially inert to the material which comprises the hollow bodies, said mandrel having dimensional stability up to at least a temperature to which it will be subjected in the actual fabrication of the bodies, subjecting it to moisture at an elevated temperature upon completion of the fabrication of a hollow body, and flushing the material of the destroyed mandrel from the hollow body.

References Cited by the Examiner
UNITED STATES PATENTS

| | | |
|---|---|---|
| 1,990,077 | 2/35 | Kershaw. |
| 2,145,009 | 1/39 | Keir _____ 29—491 X |
| 2,173,109 | 9/39 | Hamblin _____ 29—486 X |
| 2,188,925 | 2/40 | Ronay _____ 113—111 X |
| 2,258,675 | 10/41 | Cohn. |
| 2,623,148 | 12/52 | Ronay. |
| 2,796,843 | 6/57 | Kleppinger _____ 113—111 |
| 2,847,958 | 8/58 | Norton et al. _____ 113—111 |

FOREIGN PATENTS

| | | |
|---|---|---|
| 642,854 | 9/50 | Great Britain. |

JOHN F. CAMPBELL, *Primary Examiner.*